J. M. ABRAMS.
RESILIENT TIRE.
APPLICATION FILED MAY 6, 1921.

1,392,672.

Patented Oct. 4, 1921.

Inventor
John M. Abrams
By his Attorney
Fred'k R. Schuetz

UNITED STATES PATENT OFFICE.

JOHN M. ABRAMS, OF BROOKLYN, NEW YORK.

RESILIENT TIRE.

1,392,672.  Specification of Letters Patent.  Patented Oct. 4, 1921.

Application filed May 6, 1921. Serial No. 467,469.

*To all whom it may concern:*

Be it known that I, JOHN M. ABRAMS, a citizen of the United States, and a resident of Brooklyn, in the county of Kings and State of New York, have invented certain new and useful Improvements in Resilient Tires, of which the following is a specification.

The invention relates to a vehicle tire, more particularly to a tire possessing proper resiliency; and is composed of an outer rubber and fabric shoe or casing of the usual or special type, a metal substitute for the usual pneumatic tube and, if desired, an inner protector between the shoe and metal substitute. It has for its object to provide a tire which shall possess the advantages of the well-known pneumatic tire, yet have none of the disadvantages thereof. To this end, the invention consists in providing within the outer shoe or casing a flexible metal member and, generally, a special intermediate protector, the metal member being so formed as to distend normally the said casing and protector and to reinforce same. This metal member will, of course, be puncture proof; and, in accordance with the invention, is constructed of a succession of interlocked members affording transversely directed spring arms for imparting the desired resiliency to the tire. In a copending application, Serial No. 418,380, filed October 21, 1920, I have shown inwardly and outwardly extending resilient arms formed integral with a continuous metal member; and in a further application, Serial No. 460,642, filed April 12, 1921, the said arms have been shown as separable. The present invention has for its object to provide a still further construction wherein, although each set of said inwardly and outwardly extending arms are formed integral, it will be possible to renew a set in case of wear or damage thereto.

The invention will best be understood when described in connection with the accompanying drawings, in which—

Similar characters of reference designate corresponding parts throughout the several views.

Figure 1:
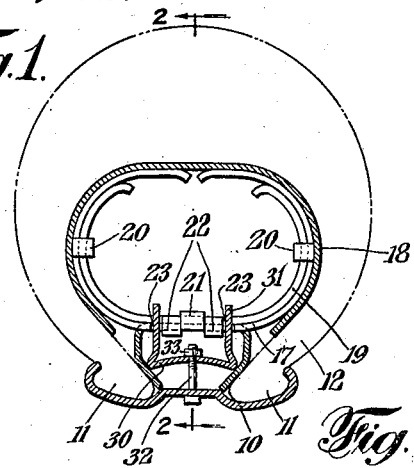
Figure 1 is a transverse section through the tire and rim.
Figure 5:
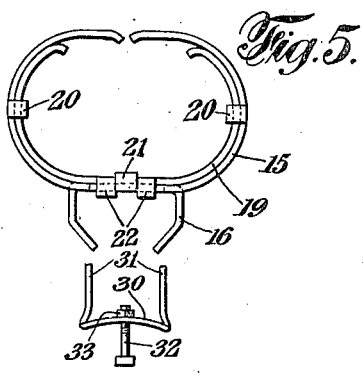
Fig. 5 is a detail view of a set of the riser and drop members and of the clamping means for attaching the same to the rim.

Referring to the drawings, 10 designates the rim of a vehicle wheel and is turned upwardly along the two outer edges to receive corresponding beads 11 of the shoe portion 12. The rim constitutes the tire supporting portion of a wheel and the said shoe may be of any well-known or special construction and suitably held to said rim.

The usual pneumatic tube, employed in connection with a shoe in tires of this character, is dispensed with in the improved tire; and the same is replaced by a metal filler member composed of sets of resilient arms and circularly disposed within said casing, the two end sets being secured as by means of suitable bolts 13 and nuts 14 and the latter being preferably permanently fixed to one of the end sets.

Figure 4:
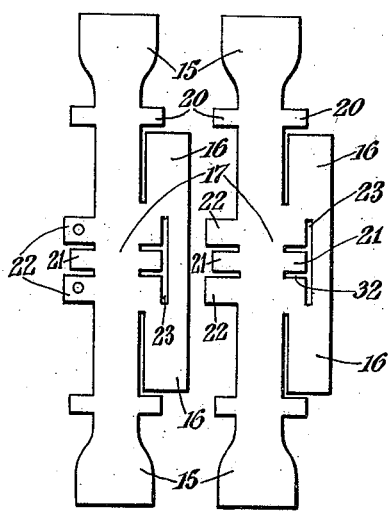
Fig. 4 is a development of two sets of the interlocking arm members.

In accordance with the present invention, the filler member is composed of a succession of interlocking pieces or sets of flexible material, as sheet metal, substantially as shown in Fig. 4 of the drawings. These individual sets have riser portions 15 extending in opposite directions and preferably flaring at the ends, and having also drops 16 disposed at one side thereof, the same being cut from the body portion 17. The risers 15 and drops 16 are thus integral with each other, and the former are turned outwardly and over the body portion thereof while the latter are turned inwardly and under said body portion for insertion in the shoe or casing 12 transversely thereof. The risers 15, moreover, are designed to substantially close over until their ends touch along the central portion, as shown in Fig. 1, said ends preferably, being somewhat expanded and contacting with the inner wall of the shoe or casing; or, preferably, with an intermediate protector 18 as of leather or composition. Moreover, in the use of the protector 18 it is preferred to indent same over a portion transversely to the tire and to fill the indentations with some suitable material as a cement, serving when dry and hard to form permanent bulges, as shown, in the protector between the risers and to cause the said protector to adhere to the shoe. The drops 16 contact with the lower inner walls of said casing and are forced and held against same in the manner hereinafter set forth.

It is preferred to so form these pairs of risers as to provide a substantially elliptical reinforcing member and support for the shoe, said member possessing proper resiliency and whereby greatly increased mileage in the use of the tire will result. In addition to the risers 15, further inside or auxiliary risers 19 may be provided to occupy a portion of the said risers 15; but the same do not extend entirely to the top of the latter. These auxiliary risers are individual pieces of metal which may be punched and separately formed and suitably hardened and tempered, being held against displacement longitudinally of the tire by means of spurs 20 integral with the risers 15 and by further spurs 21 extending upwardly from the body portion 17 and above the auxiliary risers. However, these inner leaves or auxiliary risers may be omitted, if desired, thereby simplifying the construction and reducing the cost of the filler.

Figure 2:
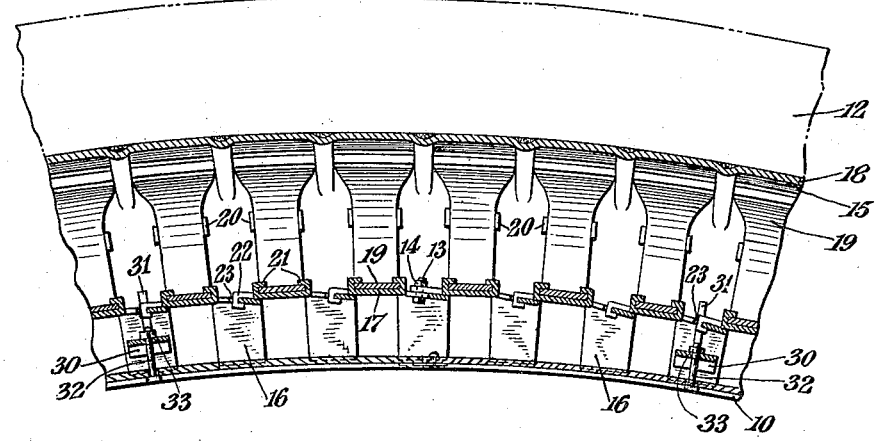
Fig. 2 is a longitudinal section taken along the line 2—2, Fig. 1.
Figure 3:
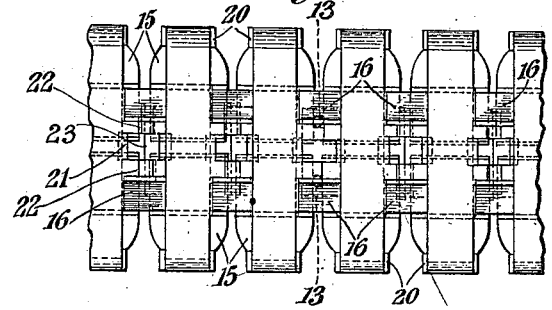
Fig. 3 is an underneath view of the cushioning means in interlocked relationship, the rim having been removed.

In order to build up the filler member from the arm forming pieces or sets shown in Fig. 4, the said pieces are provided, at their middle portion and the side opposite the drops 16, with laterally extending lugs 22. The lugs 22 of one set are, moreover, designed to fit a transverse slot 23 of the preceding set, said slot being provided in the middle portion between the drops 16. As shown in Figs. 2 and 3, the lugs 22 extend through corresponding slots 23 of the preceding pieces and are bent under same, thereby affording a continuous flexible member built up of the individual arm forming pieces and in which the drops 16 are staggered or displaced from the risers 15, being located between successive pairs of risers, as shown.

In order to positively lock the shoe to the rim, a plurality of locking or wedging members 30 are provided, the same being in the nature of arched plates having extending arms 31 fitting the slots 23 of the pieces 17 and with edges contacting with the sides of the drops 16. Means are provided, furthermore, to draw inwardly these arched plates 30 and thereby to exert the necessary pressure against the sides of the drops 16 to force the beads 11 firmly into the rim 10. To effect this result, threaded bolts 32 extend outwardly through the rim 10 and the members 30 at intervals along the said rim, which is raised in the center portion to avoid interference of the heads of the bolts with the top of the felly of the wheel. On each bolt fits a threaded nut 33 which is welded to the said arch plate. It will be understood that by rotating a bolt in the proper direction, pressure may be exerted on the arch plate to draw same inwardly and thereby obtain the desired pressure upon the drops 16. The pressure transmitted to drops 16 and sides of the shoe serves thus to spread the drops and force the beads 11 of the shoe securely into the up-turned rim portions and insure the holding by same of the shoe.

I claim:—

1. In a vehicle tire: the combination with a rim and a shoe or casing carried by same; of a resilient supporting member extending throughout the interior of said casing and comprising a succession of interlocking pieces disposed transversely of the casing and having drops extending inwardly and under the body portion thereof, and risers extending outwardly and over same.

2. In a vehicle tire: the combination with a rim and a shoe or casing carried by same; of a resilient supporting member extending throughout the interior of said casing and comprising a succession of interlocking pieces disposed transversely of the casing, said pieces having lugs and slots at opposite sides, the lugs of one piece fitting the slot of the preceding piece and said pieces having drops extending inwardly and under the body portion thereof and risers extending outwardly and over the same.

3. In a vehicle tire: the combination with a rim and a shoe or casing carried by same; of a resilient supporting member extending throughout the interior of said casing and comprising a succession of interlocking pieces disposed transversely of the casing, said pieces each having laterally projecting lugs at one side and a slot at the other side, and additional lugs extending laterally at the middle portion of said pieces and between the middle portion and ends, the first-named lugs of one piece fitting the slot of a preceding piece and said pieces having drops extending inwardly and under the body portion thereof and risers extending outwardly and over the same, and reinforcing pieces held within the corresponding risers by the said additional lugs.

4. In a vehicle tire: the combination with a rim and a shoe or casing carried by same; of a resilient supporting member extending throughout the interior of said casing and comprising a succession of interlocking pieces disposed transversely of the casing and having drops extending inwardly and under the body portion thereof, and risers extending outwardly and over same, and means to exert pressure against a portion of said drops to secure the shoe to the rim.

5. In a vehicle tire: the combination with a rim and a shoe or casing carried by same; of a resilient supporting member extending throughout the interior of said casing and comprising a succession of interlocking pieces disposed transversely of the casing and having drops extending inwardly and under the body portion thereof, and risers extending outwardly and over same, the risers being staggered with respect to the drops.

6. A supporting piece for vehicle tires, consisting of a strip of resilient metal having lugs projecting laterally from one side thereof and provided at the other side with a bendable portion having a slot.

7. A supporting piece for vehicle tires, consisting of a strip of resilient metal, flaring at the ends, having lugs projecting laterally from one side thereof and provided at the other side with a bendable portion having a slot.

Signed at Brooklyn, in the county of Kings and State of New York, this 4th day of May, A. D. 1921.

JOHN M. ABRAMS.